United States Patent
Herzhoff et al.

[11] 3,797,551
[45] Mar. 19, 1974

[54] SOLIDIFICATION OF GELATIN EMULSIONS

[75] Inventors: Peter Herzhoff, Leverkusen; Hans Gref, Cologne-Stammheim; Fritz Maus, Cologne-Flittard; Kurt Browtzki, Opladen; Josef Friedsam, Langenfeld; Willi Wasser; Wolfgang Schweicher, both of Leverkusen, all of Germany

[73] Assignee: Agfa-Gevaert Aktiengesellschaft, Leverkusen, Germany

[22] Filed: July 21, 1971

[21] Appl. No.: 164,565

[52] U.S. Cl................ 159/3, 159/4 B, 159/7, 159/13 A, 159/48, 159/49, 252/360, 252/362, 264/101, 264/141
[51] Int. Cl............. B01d 1/16, B01d 17/00, B02c, F26n 3/12, B01d 19/00, B01d 1/22, B28
[58] Field of Search............ 159/2, 2 E, 3, 47, 13 A, 159/DIG. 16, 12, 14, 49, 6, DIG. 14; 96/94; 264/91, 101, 140–143; 252/359 D, 360–363

[56] References Cited
UNITED STATES PATENTS

| | | |
|---|---|---|
| 2,939,177 | 6/1960 | Guentert et al............ 264/143 |
| 3,017,289 | 1/1962 | Miller et al............ 159/49 X |
| 3,026,273 | 3/1962 | Engles................ 264/143 |
| 3,009,514 | 11/1961 | Cohen.................. 159/49 |
| 3,248,305 | 4/1966 | Williamson........... 202/180 |
| 3,288,685 | 11/1966 | Kemper et al......... 203/11 |
| 3,395,746 | 8/1968 | Szabo et al........ 159/2 E X |
| 3,449,220 | 6/1969 | Geisler et al....... 159/49 X |
| 3,505,173 | 4/1970 | Randell................ 203/3 |
| 3,665,061 | 5/1972 | Eberly, Jr........ 264/101 X |
| 2,853,127 | 9/1958 | Sessen................ 159/47 |

Primary Examiner—Jack Sofer
Attorney, Agent, or Firm—Connolly and Hutz

[57] ABSTRACT

Warm dilute aqueous gelatin emulsions are readily and speedily concentrated and solidified by sucking a stream of such emulsion through a passageway into an expansion chamber evacuated to 7–12 Torr to cause the incoming emulsion to boil and spray solidified droplets of emulsion onto the walls of the chamber in bubble-free form. The solidified emulsion runs down from the walls with or without the help of warming means and/or directing streams of gas, to collect and solidify.

17 Claims, 3 Drawing Figures

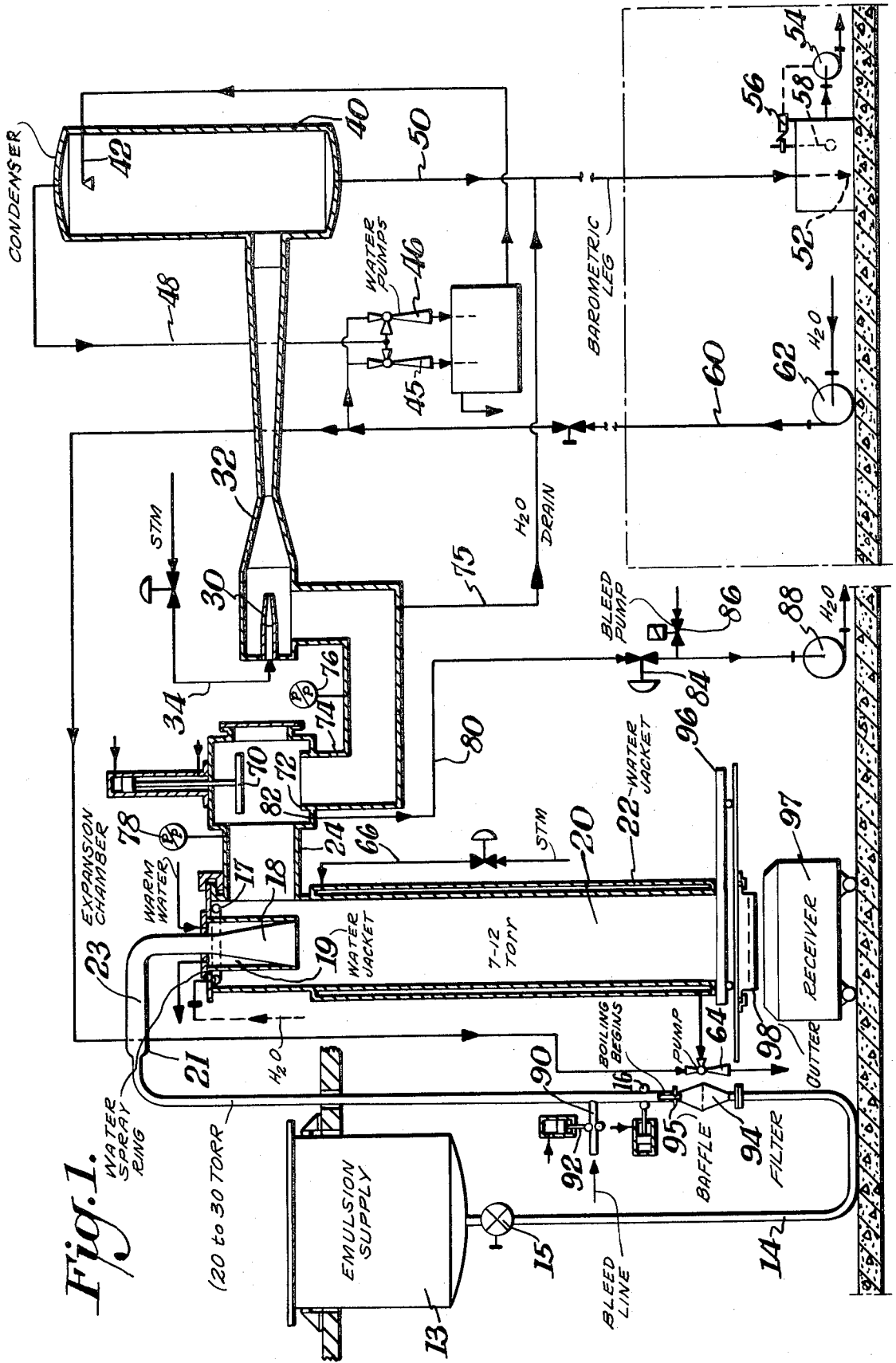

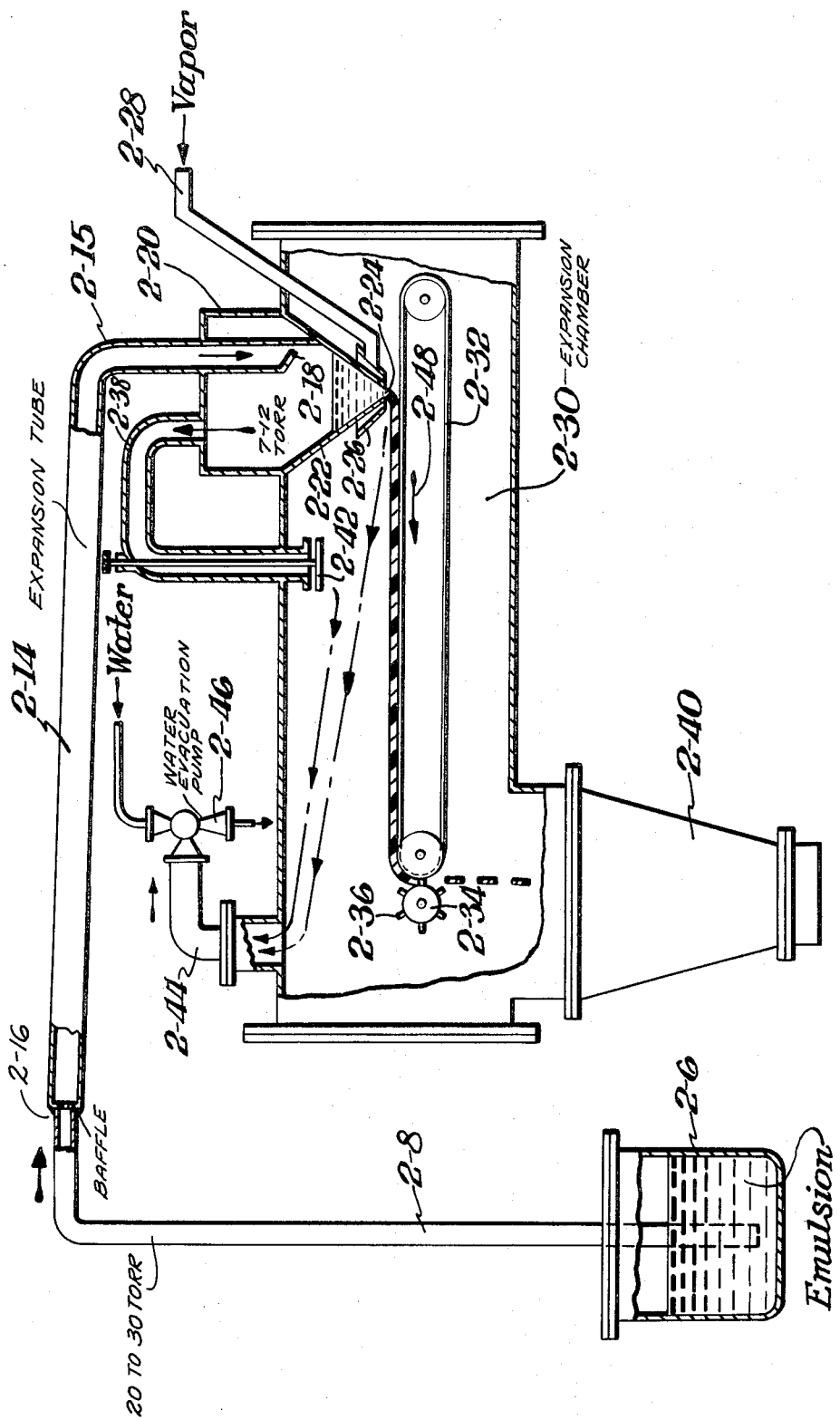

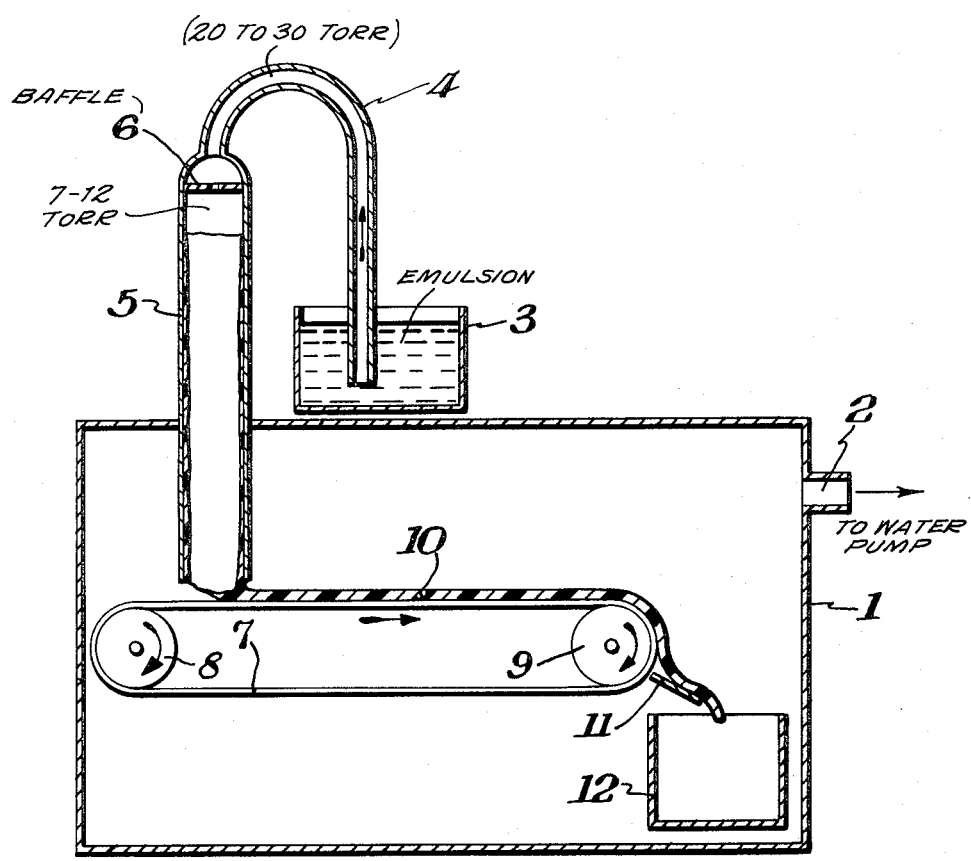

SOLIDIFICATION OF GELATIN EMULSIONS

The present invention relates to the preparation of aqueous gelatin emulsions for photographic use. Light-sensitive emulsions of this type are compounded in liquid form containing more water than needed for the final casting onto emulsion supports. In such liquid condition they are subjected to elaborate ripening treatments which leave them relatively warm, generally at temperatures of 35° to 40°C.

Among the objects of the present invention is the provision of improved processes for placing such warm dilute emulsions in condition for casting, as well as improved apparatus with which to carry out such processes.

These as well as other objects of the present invention will be more fully understood from the following description of several of its embodiments, reference being made to the accompanying drawings wherein:

FIG. 1 is a somewhat schematic side view of one form of apparatus for carrying out the present invention, parts being shown in section for better clarity; and FIGS. 2 and 3 are similar views of other embodiments of apparatus pursuant to the present invention.

According to the present invention a warm dilute liquid gelatin emulsion is sucked into a chamber evacuated to an absolute pressure in the range produced by a water pump, that is about 7 to 12 Torr from a supply at substantially higher pressure to cause the emulsion to boil and spray solidified droplets into the evacuated chamber in bubble-free form and to simultaneously cool the emulsion that is thus concentrated.

The chamber is preferably an elongated tube on the walls of which the emulsion is sprayed as a result of the pressure drop and accompanying boiling, and from which the sprayed emulsion is caused to solidify as it cools and becomes more consolidated.

A feature of the present invention is that the solidified emulsion is produced in a very simple way and is free of gas bubbles so that it is ready for casting onto the film or other support on which it is to be used. This freedom from bubbles is obtained with all photographic emulsions, including light-sensitive emulsions containing silver halides, sensitizers, color couplers, wetting agents, hardeners and stabilizers, as well as simple emulsions containing nothing more than gelatin and water, used for protective or separating layers. Moreover the cooling effect produced very rapidly cools the warm emulsion and thus keeps it from undergoing undesirable aging to which light-sensitive emulsions are subject if permitted to remain warm.

The apparatus of the present invention has emulsion supply means opening into one end of a tubular expansion chamber through which unsolidified emulsion will flow to the other end of the chamber and there drop from the chamber, evacuation means being connected to the outlet end of the tubular chamber to maintain that end of the chamber at an absolute pressure which is approximately water pump pressure, and collecting means below the outlet end to collect the emulsion flowing down the walls of the chamber.

Flow-assisting structure can be positioned around the outlet end of the expansion chamber to help the emulsion flow out properly as by warming that end to melt any prematurely adhered emulsion, and/or to direct a stream of air or other gas that helps guide the movement of the emerging emulsion.

Turning now to the drawings, the construction of FIG. 1 includes a supply container 13 in which is held at atmospheric pressure a quantity of the warm dilute emulsion to be concentrated and solidified. From the bottom of container 13 a conduit 14 valved at 15 and 16, conducts the emulsion to one end of an expansion chamber 23 in the form of a cylindrical tube bent into L-shape with an outwardly flaring outlet end 18. Outlet 18 is directed downwardly, surrounded by a water jacket 19 and is received in the upper portion of a solidifying chamber 20 large enough to hold a substantial batch of emulsion. A spray ring 17 can encircle the expansion tube end 18 at the top of chamber 20. Chamber 20 is shown as equipped with water jacket 22 over the portion of the chamber in which a batch of the solidified emulsion collects.

Adjacent its top, chamber 20 has an evacuation take-off 24 to which can be connected any evacuating means that will maintain an absolute pressure of about 7 to 12 Torr in chamber 20. As shown in the illustrated construction, a steam jet 30 and venturi 32 provide such evacuation from the jet effect of steam supplied through line 34 at a pressure of 5 atmospheres absolute. The venturi 32 leads to a condenser 40 in which the spent steam is condensed along with the water vapor sucked out of the emulsion. A water spray head 42 can be provided in the condenser to supply water cool enough to assist with the condensation. To maintain a low pressure in the condenser it is kept subject to the evacuation effects of a pair of water pumps 45, 46 whose suction line 48 is connected to the upper portion of the condenser. From its lower portion a water drain line 50 carries the condensate to a discharge. Line 50 has its discharge end 52 held under the level of the discharged water, as by having that end dip in a container, and is also long enough to provide a hydrostatic head (about 25 to 30 feet) that withstands the suction in the condenser. The excess discharged water is shown as drawn off by an electrically operated pump 54 controlled by a switch 56 turned on and off by a float 58.

Spray head 42 is shown as supplied from the discharge of the water pumps 45, 46. Also to improve the operation of these pumps, they are supplied with water from a line 60 in which the regular pressure is boosted by pump 62 to about 100 pounds per square inch. Line 60 can also be connected to operate a third water pump 64 that applies suction to the interior of water jacket 22. A steam inlet line 66 is also connected to the interior of the water jacket to warm it up when desired.

A hydraulically or pneumatically operated valve plate 70 is arranged to close off the suction take-off 24, as by lowering into sealing engagement with a valve seat 72 at the mouth of a downwardly directed pipe 74 leading from the take-off 24 and then after a short horizontal run, extending upwardly to the steam jet 30. From a low point in this pipe an additional water drain 75 can be provided. A pressure gauge 76 in the horizontal run, and another pressure gauge 78 in the take-off 24 are useful in controlling the operation. A combination bleed and preevacuation line 80 also opens into the bottom of a moat 82 surrounding valve seat 72, and is connected through valve 84 to a bleed valve 86 and a water pump 88.

Another bleed line 90 having bleed valve 92 is connected to supply conduit 14. This valve is shown as of the pinch-type operating on a yieldable length of line 90. Valve 16 is also shown as of the pinch-type and conduit 14 is also made yieldable where this pinching is applied. A filter 94 can also be provided in conduit 14, along with a fixed or adjustable baffle plate 95.

Solidifying chamber 20 has its lower end provided with a sliding cover 96 below which is a receiver 97. A cutter 98 shown as a laterally reciprocable blade-carrying frame 98 can be positioned above the receiver to cut the emulsion into short lengths as it moves out the bottom of chamber 20.

In operation the apparatus of FIG. 1 has a quantity of gelatin emulsion added to its supply container 13, the sliding cover 96 is moved into position closing off the bottom of chamber 20, plate valve 70, flow valve 16 and bleed control valves 92, 86 are closed, and valve 84 is opened. Pump 88 is now turned on and operated to bring the pressure in chamber 20 down to about 40 Torr as indicated by gauge 78. Meanwhile the steam jet 30 and its associated water streams have also been operating and have brought the pressure gauge 76 also down to about 40 Torr or less. The plate valve 70 is now opened, valve 84 closed and valve 86 opened. The steam jet then reduces the pressure in chamber 20 to about 10 Torr, and emulsion shut-off valve 16 is opened permitting the emulsion to flow into expansion tube 23.

Emulsions to be processed according the inventors can be of consistencies as described by Eder "Handbook der Photographie," 3. Edition, vol. 3, part 1, 1930, published by Verlag Wilhelm Knapp, Halle (Saale, Germany) pages 88 – 213, or by Thome Baker, "Photographic Emulsion Technique" (1948, American Photographic Publishing Co, Boston) page 80 starting, or in British Patent Specification 884,840.

When an emulsion produced as indicated in the literature noted is used and has a content of 8 percent by weight of gelatine and is at 37° C, the conduit 14, 40 millimeters in internal diameter, expansion tube 23, 100 millimeters in inside diameter flaring out to 250 millimeters over its last centimeters length, and the baffle 95 adjusted so that on its downstream face the pressure is 300 Torr, the throughput of solidified emulsion is about 100 Kg per minute. The emulsion begins to boil as it emerges from baffle 95, large quantities of vapor being emitted in the downstream length of conduit 14. The pressure in that length decreases to 20 to 30 Torr toward expansion inlet 21, where it abruptly drops to the pressure in chamber 20, causing fresh boiling of the emulsion here. The emulsion there splashes over the internal surface of tube 23 and is then a very viscous composition, having lost about 0.044 Kg of water per Kg of emulsion and having cooled down to about 11°C. Warm water is circulated through jacket 19 to keep the flared wall 18 of conduit 23 at about 35°C to cause the emulsion to flow down that surface even though it has already solidified. The emulsion thus drops into chamber 20 where it collects and consolidates until the run is completed. At that time shut-off valve 16 is closed along with plate valve 70, and valves 92 and 84 are opened to bleed air into the expansion areas. The bleed through pipe 90 moves residual emulsion in conduit 14 through tube 23, and the other bleed helps rapidly bring the pressure in chamber 20 up to atmospheric. Cover 96 can then be slid open. Steam is circulated through jacket 22 to melt the emulsion where it engages the wall of chamber 20, thus causing the emulsion collected in that chamber to slide out its lower end, generally as a solid cylindrical plug. By reciprocating cutter 98 as the emulsion descends from the chamber it can be cut into small lengths that can be collected in receiver 97 while that receiver is rolled about. About 750 Kg of solidified and cooled emulsion can conveniently be prepared as a single batch in this way in a very few minutes. Water can be sprayed down the walls of chamber 20 by means of spray ring 17 to rinse off those walls when desired, such as between batches when the composition of the emulsion is changed.

Baffle 95 can be set at any opening and can even be kept wide open. When it is wide open the initial boiling of the emulsion will take place relatively high up in conduit 14 where it approaches expansion tube inlet 21. In the illustrated construction the suction in chamber 20 pulls the emulsion up a height above the emulsion level in supply container 13, and this hydrostatic negative head should not be more than about 20 feet tall. However no head at all is needed and in fact a positive hydrostatic head can be provided by raising supply container 13 so that the emulsion level is above expansion tube inlet 21. In such arrangement boiling will not take place until the emulsion expands at expansion tube inlet 21. The various conduits, tubes and chambers in FIG. 1 can be of cylindrical, rectangular, square, elliptical or other cross-section. Also the flare at 18 can be omitted without materially affecting the operation. The cross-sectional magnitude of emulsion passing conduits helps determine flow rate but does not otherwise seriously change the boiling and cooling. It is preferred however to have an expansion zone in which the cross-sectional area increases by at least about 200 percent, that is at least triple.

The construction of FIG. 2 also provides for multiple expansion. Here an emulsion supply container 2–6 is connected by a dip-type supply conduit 2–8 to an expansion tube 2–14 that runs about 5 meters at a small downward slope (3°) with respect to the horizontal, and then curves downwardly to a depending leg 2–15 about 1.5 meters long. A baffle 2–16 having a circular opening 16 millimeters in diameter is located at the entrance end of the expansion tube, and the expansion tube has a circular cross-section with an internal diameter of 120 millimeters. At its discharge end the expansion tube has a constriction 2–18 that narrows the flow-through width to 50 millimeters, and it is surrounded by an intermediate chamber 2–20 that has a hopper-shaped bottom 2–22 which is in turn received in a final expansion chamber 2–30. The hopper bottom has a transverse width of 420 millimeters and a discharge slot 2–24 which is 2 millimeters wide extending along the bottom over its entire width. A jacket 2–26 with an open bottom is secured around the lower portion of the hopper 2–22 and is connected by line 2–28 to a source of low pressure steam (about 30 to 40 Torr absolute).

Below hopper outlet 2–24 is an endless belt conveyor 2–32 about 4 meters long and a little wider than slot 2–24 that receives emulsion discharging from that outlet and carries it as a continuous layer on its upper flight. At the far end of the conveyor a rotary knife 2–34 with a set of outwardly directed blades 2–36 engages the emulsion on the conveyor belt and cuts it into short lengths that drop into a receiver 2–40.

Intermediate chamber 2–20 has its upper portion connected as by line 2–38 having an adjustable valve control 2–42 to the interior of chamber 2–30, and that interior is evacuated through line 2-44 that leads to the suction side of a water pump 2-46.

The construction of FIG. 2 is operated similarly to that of FIG. 1, and can be operated continuously or intermittently. The chamber 2-30 has its interior reduced in pressure to about 10 Torr by the water pump, and the flow of emulsion is then started. The pressure in intermediate chamber 2-20 is adjusted to 20 to 25 Torr as the emulsion builds up in the bottom of the hopper 2-22. By having the effective height of supply conduit 2-8 less than about 3 meters, the emulsion boiling will begin as the emulsion passes through baffle 2-16. By the time the emulsion leaves the discharge end 2-18 of expansion tube 2-14 its temperature is about 22°-26°C, when the supply temperature is 37°C, and it is still very fluid. It boils again as it leaves discharge slot 2-24 and the low pressure steam which discharges from jacket 2-26 around the slot keeps the boiling emulsion spray directed at the upper surface of the belt conveyor where it builds up to a layer about 5 millimeters thick as the conveyor is slowly moved in the direction indicated by the arrow 2-48. At this point the emulsion is beginning to solidify and its temperature is about 16°C. As the emulsion is then carried by the belt conveyor it is further cooled by a little more evaporation of its water content and by the exposure to the expanding gases that are swept through chamber 2-30 toward the suction tube 2-44. As the pieces of emulsion drop from the rotary knife they can be at 11°C.

The construction of FIG. 3 has an evacuation chamber 1 connected at 2 to a water pump that keeps the pressure within the chamber about 10 Torr absolute. Above chamber 1 there is positioned a reservoir 3 for the emulsion to be treated, and a dip tube 4 dips down into the lower portion of the reservoir for withdrawing the emulsion from it. The dip tube rises to a height of about 3 meters and then curves downward to open into an expansion tube 5 about 4 meters long that descends into the evacuation chamber 1. A baffle 6 can be provided at the upper or entrance end of the expansion tube.

Below the lower end of expansion tube 5, the evacuation chamber houses a belt conveyor 7, 8, 9 which collects emulsion moving out of that tube and carries the emulsion to a stripping blade 11 which scrapes the solidified emulsion off the belt conveyor and causes it to drop into a receiver 12.

With a baffle 6 having a circular opening 16 millimeters in diameter, and expansion tube 5 cylindrical with a diameter of 120 millimeters, an aqueous gelatin emulsion with a content of 7.5 percent by weight of gelatine (or another light sensitive emulsion of similar composition, i.e. as shown in the literature noted above) at a temperature of 38° C and having a viscosity at that temperature of 8 centipoises was processed to yield 100 Kg per minute of solidified emulsion at 11° C. Boiling took place as the incoming emulsion passed baffle 6 and the boiling emulsion sprayed over the inside of expansion tube 5, and then moved down the inside wall of the tube. As the downwardly moving emulsion left tube 5, its temperature was about 22° C.

The process of the present invention will satisfactorily solidify liquid emulsions having viscosities between about 5 and 100 centipoises and with solids content of from about 5 to about 20 percent. The process can be carried out in a fully or partially automatic way by operating the various controls in a timed sequence. Alternatively the successively operated controls can be triggered by the completion of a prior operation.

It will be noted that the boiling action of the present invention can begin in an upwardly moving stream of emulsion, as in FIG. 1, in a substantially horizontally moving stream as in FIG. 2, or in a downwardly moving stream as in FIG. 3. Also while the boiling can be carried out in a single stage in which the pressure drops from about atmospheric to about 7-12 Torr, as in the construction of FIG. 3, two stage pressure drops as in the construction of FIGS. 1 and 2 are preferred. So long as the last stage drops to the 7-12 Torr level, the results produced are about the same whether the first stage drop is as little as 300 Torr (to about 460 Torr) or as much as 740 Torr (to about 20 Torr). A baffle is not needed to establish a pressure-drop location in asmuch as a passageway enlargement will also have this effect as it does at entrance end 21 of expansion tube 23. (FIG. 1).

Photographic gelatin emulsions do not have to be cooled to below about 10°C. When concentrated sufficiently for picture-taking, such emulsions do no melt at temperatures as high as 50°C, but to obtain the concentration effect in accordance with the boiling of the present invention the cooling associated with the boiling brings the temperature down. Having the final pressure in the 7 to 12 Torr range, a range easily obtained with inexpensive equipment like water pumps and steam jets, automatically limits the concentration that is effected, yielding an emulsion suitable for application to the supports with standard equipment. The dilute emulsions to be treated by the process of the present invention can have concentrations that depart from the 5-20 percent solids content range given about but more dilute emulsions have to have higher temperatures or be heated during the boiling in order to reach the desired concentration.

Obviously many modifications and variations of the present invention are possible in the light of the above teachings. It is, therefore, to be understood that within the scope of the appended claims the invention may be practiced otherwise than as specifically described.

What is claimed is:

1. An apparatus for concentrating and solidifying a warm liquid dilute aqueous gelatin emulsion, said apparatus having a supply means for delivering a stream of said emulsion, the supply means opening into one end of an unobstructed and unwiped tubular expansion chamber through which emulsion will slide to the other end of the chamber and there drop from the chamber at an outlet end, evacuation means being connected to the tubular chamber for removing vapors and heat to maintain the chamber at an absolute pressure which is from about 7 to 12 Torr, the supply means comprising a passageway at a relatively higher pressure, the end of the passageway in combination with the chamber providing an abrupt increase in cross section adjacent the entrance to the chamber at which the emulsion is caused to boil, spray and cool by the evacuation of the chamber into solidified droplets, a heater being provided on the supply means at the entrance to the chamber to prevent the sprayed droplets of solidified emulsion from sticking to it and collecting wall means below the outlet end to collect the solidified droplets being sprayed into the chamber.

2. An apparatus as set forth in claim 1 wherein the tubular chamber has walls and on the walls a heater is provided, to prevent solidified emulsion from sticking to it.

3. An apparatus as set forth in claim 1 wherein the tubular expansion chamber has a warming jacket disposed about its base helping the solidified emulsion flow out of it.

4. An apparatus as set forth in claim 1 wherein the supply means has an outwardly flaring outlet disposed within the chamber for facilitating the flow of the solidified droplets of emulsion into the evacuated chamber.

5. An apparatus as set forth in claim 4 wherein the collecting wall means at outlet end of the tubular chamber comprises a removable cover for controlling the discharge of solidified emulsion.

6. An apparatus as set forth in claim 5 wherein a cutter is mounted at the exit from the removable cover for cutting the discharged emulsion into small lengths.

7. An apparatus as set forth in claim 4 wherein the outlet of the supply means is outwardly flaring.

8. An apparatus as set forth in claim 1 wherein the supply means comprises an elongated tube.

9. An apparatus as set forth in claim 8 wherein the supply means comprises a container for storing the warm liquid dilute aqueous emulsion and an elongated tubular conduit connects the container to the tubular expansion chamber.

10. An apparatus as set forth in claim 9 wherein the elongated tubular conduit has an outwardly flaring outlet end.

11. An apparatus as set forth in claim 10 wherein the elongated tubular conduit has the section of abruptly increased cross section disposed adjacent the outwardly flaring outlet end.

12. An apparatus as set forth in claim 11 wherein an adjustable baffle is disposed in the elongated tubular conduit ahead of the intermediate expanding section for controlling the preliminary boiling of the emulsion.

13. The process of solidifying a warm dilute liquid aqueous gelatin emulsion in an unobstructed unwiped evacuated chamber which comprises the steps of evacuating the chamber to an absolute pressure in the range of about 7 to 12 Torr, supplying the liquid emulsion to the chamber through a passageway at a relatively higher pressure, said passageway increasing its cross section abruptly proximate the entrance to the chamber whereby the emulsion is caused to boil in the passageway and to spray droplets of emulsion into the chamber, abstracting vapors and heat from the evacuated chamber to maintain the absolute pressure of about 7 to 12 Torr in the chamber whereby the droplets substantially immediately solidify as they spray into it to form substantially bubble-free solidified droplets of emulsion, and collecting the solidified droplets of emulsion in the chamber.

14. The process as set forth in claim 13 wherein the portion of the evacuated chamber first contacted by the solidifying emulsion is heated to prevent the solidifying emulsion from sticking to it.

15. The process as set forth in claim 13 wherein the liquid emulsion is pre-expanded in said passageway at an intermediate absolute pressure from about 20–30 Torr before it passes into the evacuated chamber.

16. The process as set forth in claim 15 wherein the evacuated chamber has an outlet, and the outlet is heated to prevent the solidified emulsion from sticking to the outlet and clogging it.

17. The process as set forth in claim 16 wherein the solidified emulsion is cut into pieces as it passes out of the outlet.

* * * * *